E. S. WOODS.
CENTER BEARING.
APPLICATION FILED DEC. 24, 1909.

1,057,792.

Patented Apr. 1, 1913.

Witnesses:
T. N. Alfred
L. R. Wilkins

Inventor
Edwin S. Woods
by Poole & Brown Attys

UNITED STATES PATENT OFFICE.

EDWIN S. WOODS, OF CHICAGO, ILLINOIS.

CENTER-BEARING.

1,057,792.  Specification of Letters Patent.  Patented Apr. 1, 1913.

Application filed December 24, 1909. Serial No. 534,832.

*To all whom it may concern:*

Be it known that I, EDWIN S. WOODS, a citizen of the United States, and a resident of Chicago, in the county of Cook and State of Illinois, have invented certain new and useful Improvements in Center-Bearings; and I do hereby declare that the following is a full, clear, and exact description thereof, reference being had to the accompanying drawings, and to the letters of reference marked thereon, which form a part of this specification.

This invention relates to an improvement in antifriction bearings adapted to provide frictionless engagement between two parts which have angular movement, one with reference to the other, about a central axis.

My invention is more especially adapted to, and is shown herein as applied, to a center bearing for railroad cars such, for example, as that described in an application filed by me on the 3rd day of September, 1907, Serial No. 391,039, said bearing comprising a plurality of closely nested, conical antifriction elements arranged about a central axis and providing for a maximum number of lines of contact between the antifriction elements and the upper and lower bearing plates.

The various advantages of my improved bearing will appear and be particularly pointed out as I proceed with my specification.

Figure 1:
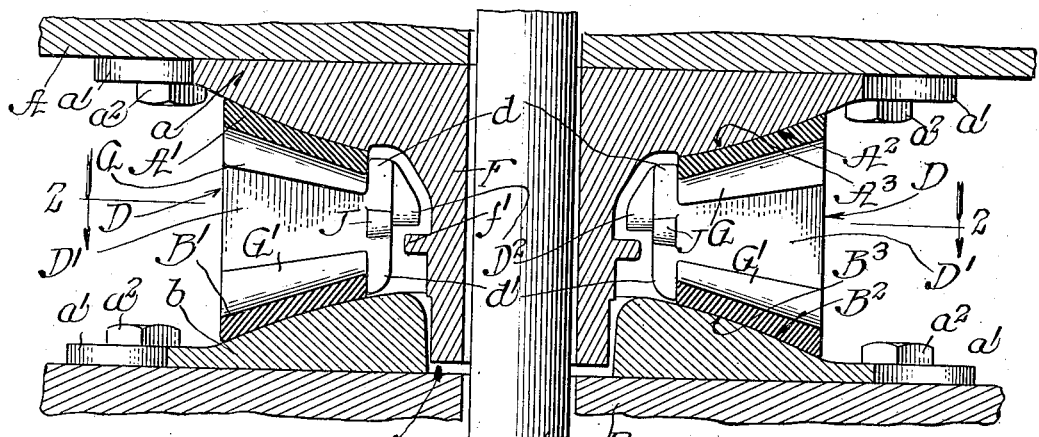
Figure 2:
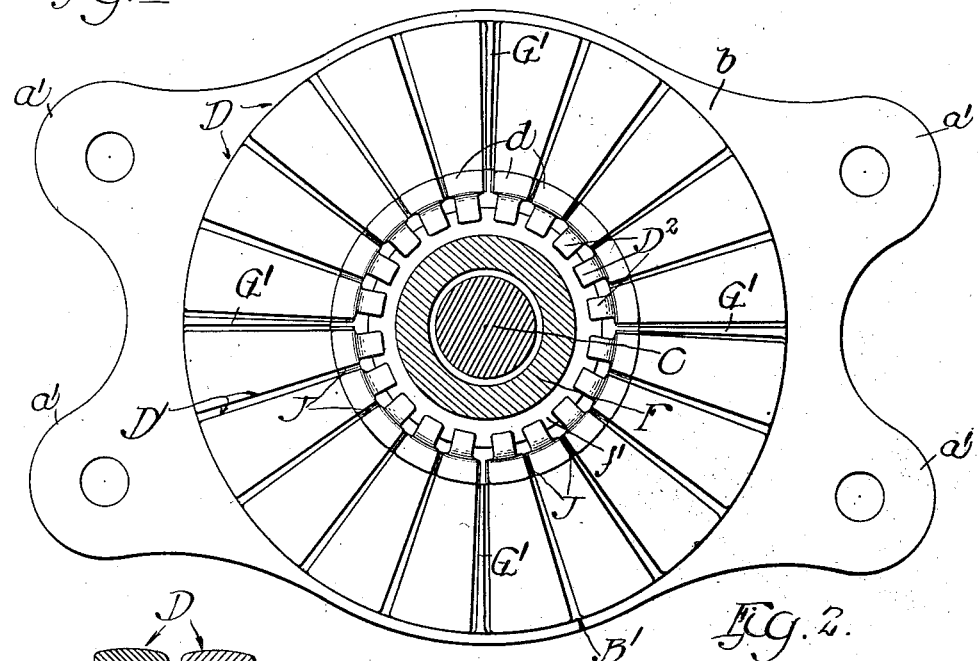
Figure 4:
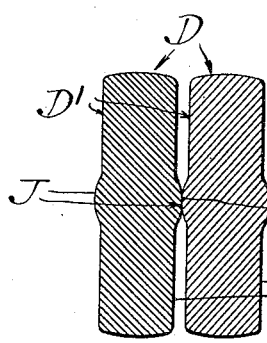
Figure 3:
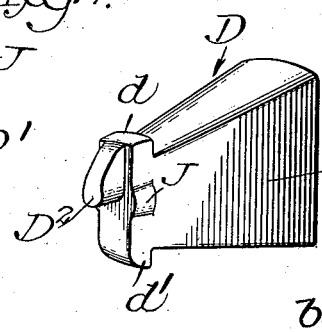

In the drawings:—Figure 1 is a vertical, central section through my improved center bearing. Fig. 2 is a horizontal section through Fig. 1 on the line 2—2 thereof, with the antifriction elements shown in top plan view. Fig. 3 is a perspective view of one of the antifriction elements. Fig. 4 is a vertical section through the adjacent antifriction elements near their inner ends.

In the drawings, A indicates the car body bolster, B, the truck bolster and C, the center post or king pin about which the bearing members turn.

$a$ indicates the support for an upper bearing member designated by $A^1$, and $b$, the support for a lower bearing member designated by $B^1$. Closely nested about the center post, with their axes arranged radially and bearing between the upper and lower members $A^1$, $B^1$, is a plurality of antifriction elements D. The supports $a$ and $b$ are secured, respectively, to the body bolster A and to the truck bolster B in any convenient manner as, for example, by means of lugs and bolts indicated at $a^1$, $a^2$. The bearing members $A^1$, $B^1$ consist of flat, conical shells with their inner faces formed in surfaces of spheres as indicated at $A^2$, $B^2$ to engage similar spherical bearing faces $A^3$, $B^3$ formed, respectively, on said supports $a$, $b$. A depending hollow stem F, which loosely engages the center pin C, is formed on one of the supports $a$, and engages loosely within a central, annular opening $f$ formed in the other support $b$. This construction furnishes a universal bearing above and below the antifriction elements so that the load is always evenly distributed over the antifriction elements. Provision is thus made for a limited relative movement of the component parts of the bearing in any plane common to the central axis of the bearing and an axis of one of the antifriction elements.

As shown herein, the antifriction elements are in the form of cones, as clearly illustrated in Fig. 3, with their sides flattened or cut away, as indicated at $D^1$, to provide for close nesting of the elements. The inner, smaller ends of the antifriction elements or rockers D are provided with upper and lower vertical lugs or stops $d$, $d^1$ which are adapted to engage the inner edges of the upper and lower bearing plates, respectively, $A^1$, $B^1$. A tail piece $D^2$ projects inwardly from the inner end of the antifriction element above an annular shoulder $f^1$ formed on the depending hollow stem F of the upper bearing member support $a$. The end thrust of the antifriction elements D is taken up entirely by the lugs or stops $d$, $d^1$ at their inner ends. This construction reduces to a minimum the frictional resistance to the rocking of each antifriction element due to its end thrust, by bringing the locus of said frictional resistance near the axis of the antifriction element and thus reducing its leverage to resist the rocking of said element.

Another advantage of this construction is that the antifriction elements more securely retain their radial position. To further insure said radial position, I provide on the upper and lower bearing members $A^1$, $B^1$, radially extending ribs G, $G^1$, preferably four in number, arranged at angles of 90°, and dividing said bearing members into quadrants. Said ribs are cast integrally with said bearing members. If desired these ribs may be provided on one bearing plate only, but their use on both is preferable. It is particularly desirable in a bearing of this kind to maintain the antifriction elements in proper relation and to this end, I provide segments of disks J on each flat vertical face of said elements at their inner, smaller ends, the centers of said disk segments coinciding with the axes of the antifriction elements. When the bearing is assembled, the disk segments of neighboring antifriction elements engage and thereby hold said elements in the desired spaced relation.

In assembling the bearing, the tail pieces $D^2$ by engagement with the annular shoulder $f^1$ on the stem F of the upper bearing member support $a$, and the upper stop or lug $d$ by engagement with the inner edge of the upper bearing member $A^1$ furnish temporary support for the antifriction element D.

While I have shown and described herein one embodiment of my invention, it is apparent that the mechanical details of construction and arrangement illustrated may be variously modified without departing from the spirit of my invention and I do not wish to be limited to them except as pointed out in the appended claims.

I claim as my invention:—

1. In a center bearing, in combination with upper and lower bearing members, upper and lower supports for said bearing members, said upper and lower bearing members having universal movement with reference to said supports, a plurality of conical antifriction elements, and means provided at the inner ends of said antifriction elements to resist the end thrust thereof, said means engaging the inner edges of said upper and lower bearing members.

2. In a center bearing, in combination with upper and lower bearing members, upper and lower supports for said bearing members, said upper and lower bearing members having universal movement with reference to said supports, a plurality of conical antifriction elements having rolling engagement with said upper and lower bearing members, and lugs or stops formed at the inner ends of said antifriction elements adapted to engage the inner edges of said bearing members to resist the end thrust on said antifriction elements.

3. In a center bearing, in combination with upper and lower bearing members, upper and lower supports for said bearing members, said upper and lower bearing members being capable of sliding adjustment with reference to said supports, a plurality of closely nested, conical antifriction elements having rolling engagement with said bearing members, said antifriction elements being provided with vertical lugs or stops adapted to engage the inner edges of one of said bearing members to resist the end thrust of said antifriction elements.

4. In a center bearing, in combination with upper and lower bearing members, upper and lower supports for said bearing members, said bearing members being capable of sliding adjustment with reference to said upper and lower supports, a plurality of closely nested, conical antifriction elements, means provided at the inner ends of said antifriction elements to resist the end thrust thereof, said means engaging the inner edges of said bearing members, tail-pieces projecting from the inner ends of said antifriction elements, and an annular shoulder moving with one of said bearing members adapted to engage said tail-pieces when the lower bearing member is removed.

In testimony that I claim the foregoing as my invention I affix my signature in the presence of two witnesses, this 14th day of December A. D. 1909.

EDWIN S. WOODS.

Witnesses:
CLARENCE E. MEHLHOPE,
T. H. ALFREDS.